United States Patent Office 3,772,389
Patented Nov. 13, 1973

3,772,389
PROCESS FOR THE SYNTHESIS OF
PHENYL ESTERS
William W. Lowrance, Jr., Kingsport, Tenn., assignor to
Eastman Kodak Company, Rochester, N.Y.
No Drawing. Filed June 24, 1971, Ser. No. 156,544
Int. Cl. C07c 69/24, 69/78, 121/60
U.S. Cl. 260—465 D         13 Claims

ABSTRACT OF THE DISCLOSURE

A process for the synthesis of phenyl esters directly from the corresponding phenols and carboxylic acids which comprises contacting a phenolic compound having at least one hydrogen atom adjacent the active hydroxyl group with a carboxylic acid compound containing at least one active carboxylic group in the presence of a catalytic amount of a borate-sulfuric acid catalyst complex. The process is carried out in a single stage reactor which may be operated at from 75° C. to 285° C. under atmospheric, subatmospheric or superatmospheric pressure. If desirable, a solvent can be employed.

This invention relates to a process for the synthesis of phenyl esters directly from the corresponding phenols and carboxylic acids. More particularly, this invention relates to a process whereby phenols are reacted with mono- or polycarboxylic acids in the presence of a catalytic amount of a blend of borate, preferably in the form of boric acid, and sulfuric acid to give phenyl esters.

Phenyl esters such as phenyl benzoate have been found to be useful as polymer modifiers, plasticizers, anti-oxidants and solvents as well as intermediates in a number of chemical reactions such as in the manufacture of dyes, pharmaceuticals and antioxidants. However, their relatively high costs have heretofore limited their commercial acceptance for these uses. This high cost is primarily due to the processes whereby it has heretofore been necessary to produce these phenyl esters. For example, one of the better prior art processes for producing phenyl benzoate involved the following reaction:

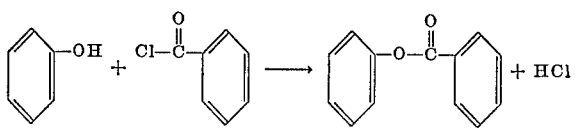

As will be appreciated, the fact that carboxylic acid chlorides must be used as one of the reactants greatly increases the cost of the process. Also, the fact that hydrochloric acid is a by-product of this reaction necessitates the use of expensive process equipment, purification steps, etc. Another prior art process for producing phenyl esters involved reacting stoichiometric amounts of boric acid with the phenol to give aryl borates. These aryl borates were then subjected to acidolysis by carboxylic acids. [See, for example, Chem. Abstract 48, 10536d (1954) and Chem. Abstract 49, 11593d (1955).] However, the fact that stoichiometric amounts of boric acid must be used in this type process makes is commercially unattractive. Thus, a need exists for a process whereby phenyl esters can be simply and easily produced from relatively inexpensive reactants without producing undesirable by-products which unduly add to the manufacturing costs of the phenyl esters.

The ideal process for the production of phenyl esters would involve the direct esterification of the desired phenol with a selected carboxylic acid. Such a reaction would give the desired phenyl ester with water being the only by-product produced. This reaction may be represented as follows for the production of phenyl benzoate:

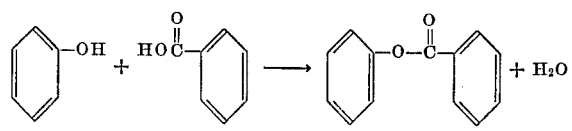

However, it has heretofore been found impossible to produce phenyl esters from phenols and carboxylic acids by a direct esterification process of this type. In fact, it has been the accepted belief of those working in the phenyl ester field that such a direct esterification reaction could not be carried out. For example, there are numerous statements in standard reference texts which clearly teach that phenols cannot be esterified by direct reaction with carboxylic acids. The following texts, among others, make such statements:

E. H. Rodd, Chemistry of Carbon Compounds, a Modern Comprehensive Treatise, III A, Elsevier, N.Y., 1954, pp. 415, 431
R. B. Wagner and H. D. Zook, Synthetic Organic Chemistry (Wiley, New York, 1953), p. 480

Such a direct esterification process is, however, made possible for the first time by the process of this invention.

In accordance with this invention a process for the synthesis of phenyl esters has been discovered which comprises contacting a phenolic compound having at least one hydrogen atom adjacent the active hydroxyl group with a carboxylic acid compound containing at least one active carboxylic group in the presence of a catalytic amount of a borate-sulfuric acid complex at a suitable temperature and for a period of time sufficient to produce the desired phenyl ester. More specifically, a process involving the use of a novel borate-sulfuric acid catalyst has been found whereby phenolic compounds having the general formula:

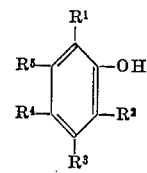

can be directly esterified with carboxylic compounds having the general formula:

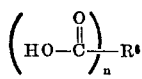

to give phenyl esters having the general formula:

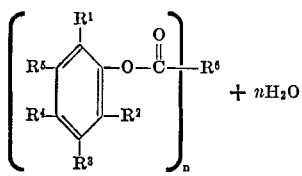

In the above formulas, $n$ is a positive integer of from 1 to 3. At least one of the substituents $R^1$ and $R^2$ of the formulas must be a hydrogen atom while the remaining substituent, as well as the substituents $R^3$–$R^5$, can be the same or different monovalent substituents bound to the ring by a covalent bond and can be any such substituent which does not sterically hinder or otherwise prevent the hydroxyl group of the phenolic compound from entering into the reaction with the carboxylic compound.

Typical monovalent substituents which are suitable include halogen atoms and alkyl, aryl, substituted aryl, hydroxy, alkoxy, aryloxy, amino, substituted amino, quaternized ammonium, substituted sulfonyl, fluorinated alkyl, cyano, thiocyano, thiol and nitro groups, for example. The monovalent substituents named are illustrative, and not limiting, because, as noted, any monovalent substituent bound to the ring by a covalent bond which does not sterically hinder or destroy the ability of the hydroxyl group of the phenolic compound from entering into the reaction with the carboxylic compound can be present. Any or all of the substituents $R^1$–$R^5$ may also be hydrogen atoms, and as previously noted, at least one of the substituents $R^1$ or $R^2$ must be hydrogen.

Chlorine, bromine, fluorine and iodine atoms are illustrative of the halogen atoms which are suitable as substituents. When one or more of the substituents is alkyl, it can have 1 to 18 carbon atoms, and preferably 1 to 12, such as methyl, ethyl, propyl, isopropyl, n-butyl, isobutyl, tertiary butyl, n-pentyl, tertiary amyl, n-hexyl, n-decyl, n-docecyl, n-hexadecyl, n-octadecyl or tertiary octyl, for example.

Suitable aryl or substituted aryl substituents are preferably mononuclear aryl of from 6 to 12 carbon atoms such as phenyl, methylphenyl, ethylphenyl, chlorophenyl, bromophenyl, methoxyphenyl, ethoxyphenyl or other substituted phenyl nuclei. However, an aryl nucleus of 4 or more carbon atoms such as 1-naphthyl or 2-naphthyl and substituted derivatives thereof such as, for example, furyl, thienyl, etc., can be formed involving adjacent R groups and are included in the term "aryl" as used herein.

Illustrative of the alkoxy groups suitable as substituents are alkoxy groups having from 1 to 18 carbon atoms and preferably from 1 to 6 carbon atoms, such as methoxy, ethoxy, propoxy, isopropoxy, n-butoxy, isobutoxy, n-amyloxy, isoamyloxy and hexoxy, for example.

Phenoxy and naphthoxy are illustrative aryloxy groups which may be used as substituents and may have from 6 to 12 carbon atoms.

Monoalkylamino, dialkylamino (wherein the alkyl groups are the same or different), arylamino, aralkylamino, cycloalkylamino, monohydroxyalkylamino, dihydroxyalkylamino, alkoxyalkylamino and other aliphatic amino, groups, for example, are illustrative of the substituted amino groups which may be substituents. Normally the alkyl, hydroxyalkyl or alkoxyalkyl groups present in such amino groups contain no more than 4 carbon atoms although they can contain more.

Illustrative of the substituted sulfonyl groups which may be present in the $R^1$ or $R^2$ and/or $R^3$–$R^5$ positions are alkyl-sulfonyl groups having from 1 to 18 carbon atoms and preferably from 1 to 4 carbon atoms such as methylsulfonyl, ethylsulfonyl, propylsulfonyl, butylsulfonyl, etc., and arylsulfonyl, preferably mononuclear arylsulfonyl such as phenylsulfonyl, methylphenylsulfonyl, chlorophenylsulfonyl and ethoxyphenylsulfonyl.

$R^1$ or $R^2$ and/or $R^3$–$R^5$ can also be a fluorinated alkyl group having 1 to 18 carbon atoms. Difluoroalkyl groups having the formula $-(CH_2)_xCHF_2$ and trifluoroalkyl groups having the formula $-(CH_2)_xCF_2$ wherein X is a positive integer of from 1 to 17 are illustrative. Higher fluorinated alkyl groups such as $$-(CH_2)_{m_1}-(CF_2)_m-CF_3$$

wherein $m$ is a positive integer of from 1 to 4, for example, and $m_1$ is a positive integer of 1 or 2, can also be present and are intended to be included in the term "fluorinated alkyl" with 2,2-difluoroethyl; 3,3-difluoro-n-propyl; 4,4-difluoro-n-butyl; 5,5-difluoro-n-amyl; 6,6-difluoro-n-hexyl; 2,2,2-trifluoroethyl; 3,3,3-trifluoro-n-propyl; 4,4,4-trifluoro-n-butyl; 5,5,5-trifluoro-n-amyl; 6,6,6-trifluoro-n-hexyl;

$-CH_2CH_2CF_3$; $-CH_2CH_2CF_2CF_3$;

$-CH_2CH_2CH_2CF_2CF_3$ and $-CH_2CH_2CF_2CF_2CF_3$ being illustrative of such fluorinated alkyl groups.

$R^1$ or $R^2$ and/or $R^3$–$R^5$ are not limited to the particular substituents noted herein. As stated hereinbefore, $R^1$–$R^5$ can be any monovalent substituent, bound by a covalent bond, so long as the hydroxyl group of the phenolic compound is not prevented by the substituent from entering into the reaction with the carboxylic compound.

The substituent $R^6$ can be either a mono-, bi- or trivalent radical bound to each carboxylic group by a covalent bond and can be any such substituent which does not hinder or prevent at least one of the carboxylic groups of the carboxylic compound from entering into the reaction with the hydroxyl group of the phenolic compound to give the desired phenyl ester.

Typical monovalent substituents $R^6$ include alkyl, aryl and substituted aryl, for example. When $R^6$ is alkyl, it can have 1 to 18 carbon atoms, and preferably 1 to 12 carbon atoms, such as methyl, ethyl, propyl, isopropyl, n-butyl, isobutyl, n-pentyl, n-hexyl, n-decyl, n-dodecyl, n-hexadecyl or n-octadecyl, for example. When $R^6$ is aryl or substituted aryl, it may be of 6 to 18 carbon atoms and is preferably mononuclear aryl of 6 to 12 carbon atoms such as phenyl, methylphenyl, ethylphenyl, chlorophenyl, bromophenyl methoxyphenyl, ethoxyphenyl or other substituted phenyl nuclei. $R^6$ can also be an aryl nucleus such as 1-naphthyl or 2-naphthyl and substituted derivatives thereof, such as, for example, furyl, thienyl, etc. The substituent $R^6$ cannot, however, be an ortho-hydroxyaryl group; compounds such as salicylic acid or 1-hydroxy-2-naphthoic acid fail to undergo the esterification.

Monocarboxylic saturated acids which have been found particularly useful as the carboxylic compounds of this process include acetic, propionic, butyric, valeric, caproic, enanthic, caprylic, pelargonic, capric, undecyclic, lauric, myristic, palmitic and stearic. Aliphatic dicarboxylic acids which have also been found particularly useful include succinic, glutaric, adipic, pimelic, suberic, azelaic and sebacic. Aryl carboxylic acids that are particularly useful include benzoic, toluic, chlorobenzoic, nitrobenzoic, naphthoic, 1,8-naphthalic, isophthalic, terephthalic, tetramethylterephthalic and cinnamic.

As mentioned hereinabove, the direct esterification of the phenolic compounds with carboxylic acid compounds in accordance with the present invention must be carried out in the presence of a borate-sulfuric acid catalyst. The borate constituent of the catalyst may be supplied by any substance or compound which will release borate in catalytic amounts in the presence of the sulfuric acid constituent and/or the phenol-carboxylic acid reactants or byproducts, and will not hinder or prevent the hydroxyl group of the phenolic compound from entering into the reaction with the carboxylic compound to give the desired phenyl ester. Examples of compounds containing borate which may be used include: (a) boron halides such as, for example, boron tribromide, boron trichloride and boron trifluoride; (b) boric acid and boric anhydride; (c) polyborates such as, for example, diboron tetrachloride, diboron tetrahydroxide, magnesium borate, calcium borate, ammonium borate, potassium tetraborate, lithium borate and sodium borate; as well as (d) salts of ortho and meta-boric acids such as, for example, sodium metaborate. As mentioned hereinbefore, the boron constituent of the catalyst may be supplied by any substance or compound containing boron which will release catalytic amounts of borate in the presence of the sulfuric acid constituent and/or the phenol-carboxylic acid reactants or by-products, and will not hinder or prevent the hydroxyl group of the phenolic compound from entering into the reaction with the carboxylic compound to give the desired phenyl ester.

The sulfuric acid constituent of the catalyst may also be supplied by any substance which will form or release catalytic amounts of sulfuric acid in the presence of the borate constituent and/or the phenol-carboxylic acid reactants or by-products, and will not hinder or prevent the hydroxyl group of the phenolic compound from entering into the reaction with the carboxylic compound to give the desired phenyl ester. Examples of compounds which may be used to supply the sulfuric acid constituent include, for example, sulfuric acid, sulfur trioxide, sodium hydrogen sulfate, potassium hydrogen sulfate and dimethyl sulfate.

The carboxylic compounds may be reacted with the phenolic compound over a wide range of molar proportions in accordance with the provisions of the present invention. For example, the proportion of the phenolic compound and the carboxylic compound may be equimolar or approximately equimolar. However, almost any proportion may be employed in the reaction. For example, the carboxylic compound may be employed in a molar ratio of 0.1:1 to 10:1 or more with respect to the phenolic compound in the mixture. If desirable, blends or mixtures of the carboxylic compounds can be reacted with blends or mixtures of the phenolic compounds to give a blend or mixture of phenyl esters.

The reaction of the present invention may be carried out in the melt phase in the absence of a diluent or solvent provided a means of removing the water is employed. For instance, the reaction may be conducted in a vacuum to distill out water of reaction. However, in many instances it is preferred to include such a diluent or solvent in the reaction mixture. This is especially true since the process must be performed in such a way as to provide for the continuous removal of the water which is formed as a by-product of the reaction. Thus, it is advantageous to use diluents or solvents which form azeotrope mixtures with water within the temperature range at which the reaction is carried out so that water can be removed by by distillation. The diluents or solvents naturally should be non-reactive with any of the catalysts, reactants, products or by-products present in the mixture. Examples of such diluents or solvents that are useful in the practice of the invention include aliphatic or aromatic hydrocarbons, esters, ethers, sulfoxides, sulfones, nitriles, amides and phosphoramides. These include hexane, heptane, toluene, xylene, cyclohexane, decalin, benzene, tetrahydrofuran, dioxane, dimethylsulfoxide, dimethylformamide, dimethylsulfone, acetonitrile, hexamethylphosphoramide, sulfolane, diphenyl ether, petroleum ether, and mixtures thereof or other similar non-reactant materials. The phenyl ester product produced by the reaction may also serve as the diluent or solvent.

The temperature at which the reaction is carried out may be varied over a wide range. For example, the reaction proceeds satisfactorily at temperatures as low as about 75° C. and as high as about 285° C., with the preferred range being from about 100° C. to about 250° C. At temperatures below about 75° C. the reaction will still proceed, but at a slow rate which will be below that normally desired for commercial processes. At temperatures above about 285° C. the phenyl ester begins to become discolored due to the occurrence of side reactions. In certain instances such discolored phenyl esters can be used commercially, but normally commercial demand calls for the production of relatively clean esters. Duration of the reaction should be such as to allow for conversion of the carboxylic and phenolic compounds to the corresponding esters and water. Normally, the reaction is completed within a time range of from about 1 to 50 hours, preferably from 1 to 24 hours, although periods outside these ranges might be used under special conditions.

The reaction takes place readily at atmospheric pressure and is advantageously carried out in this manner. However, an elevated pressure may be utilized if desired as may subatmospheric pressure provided it is not so low as to unduly volatilize the reactants. It is preferable but not necessary to conduct the process in a blanketed atmosphere of inert gas such as nitrogen or argon.

The borate-sulfuric acid catalyst may be employed in amounts ranging from 0.01 to 20 mole percent with respect to the phenolic compound employed in the reaction, with the preferred range being from about 1 to 10 mole percent. The molar proportions of the borate to sulfuric acid constituent may vary over a wide range. For example, the borate to sulfuric acid constituent may vary in a molar ratio of 0.01:1 to 10:1 or more with the preferred ratio being between about 0.1:1 to 2:1. The borate sulfuric acid catalyst may be prepared separately by blending the borate constituent with the sulfuric acid after which the blend is added to the carboxylic and phenolic reactants. Conversely, the borate and sulfuric acid constituents may be added separately to the process in which case they combine within the process to form the novel borate-sulfuric acid catalyst.

The reaction process is carried out in a single stage reactor to which is added the desired reactants and catalysts. The temperature of reaction is maintained until the reactants have formed the desired phenyl esters. The phenyl esters produced by the single stage reaction process may be recovered by appropriate crystallization or distillation. In the crystallization purification the phenyl esters product is cooled to a point where the esters solidify or crystallize out of the reaction mixture. The solid phenyl esters are then separated from the reaction mixture by filtration. In the distillation purification the reaction mixture is heated to the point where the impurities of the mixture are distilled away from the phenyl ester products. Normally, the distillation is conducted at reduced pressure.

The following examples are illustrative of the present invention and should not be construed as limiting the invention in any way.

EXAMPLE 1

A 0.5 liter, four-necked, round-bottomed flask is fitted with a mechanical stirrer, nitrogen gas purge, thermometer and Dean-Stark trap which is in turn fitted beneath a water-cooled condenser. After the flask has been purged with nitrogen, it is charged with 25 grams (0.27 mole) of phenol and 32 grams (0.27 mole) of benzoic acid in 250 ml. of toluene to which has been added 0.84 grams of boric acid. The reactants are refluxed under a nitrogen atmosphere for 24 hours. At the end of this period of time it is determined that no appreciable amount of phenyl benzoate has been formed. Thus, this example illustrates that boric acid alone is not an effective catalyst for this reaction.

EXAMPLE 2

The procedure of Example 1 is repeated except that the boric acid is replaced with 0.5 gram of sulfuric acid. At the end of the 24-hour reflux period it is determined that no appreciable amount of phenyl benzoate has been formed. This example, therefore, illustrates that sulfuric acid alone is not an effective catalyst for this reaction.

EXAMPLE 3

The procedure of Example 1 is repeated except that 0.5 gram of sulfuric acid is added to the xylene solution containing the 0.84 gram of boric acid. After the 24-hour reflux period, the solution is cooled, washed with aqueous $NaHCO_3$ and water, and dried over $MgSO_4$. Evaporation of the solvent leaves 49 grams (94% yield) of phenyl benzoate. This examples thus illustrates that a borate-sulfuric acid complex is an effective catalyst for the synthesis of phenyl esters directly from the corresponding phenols and carboxylic acids.

The following Examples 4–7 illustrate that a number of materials which might normally be considered closely related to or interchangeable with sulfuric acid are not effective as catalysts for the synthesis of phenyl esters directly from the corresponding phenols and carboxylic acids.

EXAMPLE 4

The procedure of Example 1 is repeated except that 5 mole percent by weight of zinc chloride is added to the toluene solution containing the phenol, benzoic acid and boric acid constituents, and this charge is refluxed for 12 hours. At the end of the 12-hour reflux period it is determined that no appreciable amount of phenyl benzoate has been formed.

EXAMPLE 5

The procedure of Example 4 is repeated except that 5 mole percent by weight of para-toluenesulfonic acid is substituted for the zinc chloride. Again, no appreciable amount of phenyl benzoate is formed.

EXAMPLE 6

The procedure of Example 4 is repeated except that 5 mole percent by weight of boron trifluoride is substituted for the zinc chloride. Again, no appreciable amount of phenyl benzoate is formed.

EXAMPLE 7

The procedure of Example 4 is repeated except that 5 mole percent by weight of phosphoric acid is substituted for the zinc chloride. Again no appreciable amount of phenyl benzoate is formed.

EXAMPLE 8

The procedure of Example 1 is repeated except that 5 mole percent by weight of boron triphosphate was substituted for the boric acid. After the reflux period, it is determined that no phenyl benzoate has been formed. Thus, this example illustrates that boron triphosphate is not an effective catalyst for the production of phenyl esters.

EXAMPLE 9

A one-liter, four-necked, round-bottomed flask is fitted with a mechanical stirrer, nitrogen gas purge, thermometer and Dean-Stark trap which is in turn fitted beneath a water-cooled condenser. After the flask has been purged with nitrogen, it is charged with 3.7 grams of 2,6-dimethylphenol, 125 ml. of xylene, 0.09 gram of boric acid, 0.2 gram of sulfuric acid and 5.0 grams of 2,4,6-trimethylbenzoic acid. The solution is then heated at reflux for 26 hours, after which it is determined that no appreciable amount of a phenyl ester (i.e., 2,6-dimethylphenyl-2,4,6-trimethylbenzoate) was formed. Thus, this example illustrates that methyl substituents adjacent to the phenolic hydroxyl interferes with the esterification process.

EXAMPLE 10

The process of Example 9 is repeated except that 2,3-dimethylphenol is substituted for the 2,6-dimethylphenol. After reflux for 24 hours, it is determined that the phenyl ester 2,3-dimethylphenyl-2,4,6-trimethylbenzoate is formed in substantial quantities. This example, taken with Example 9, illustrates that at least one of the substituents adjacent the phenolic hydroxyl must be a hydrogen atom.

EXAMPLE 11

The process of Example 9 is repeated except that the flask is charged with a solution of 27 grams of 2,4,6-trimethylphenol and 29 grams of 4-cyanobenzoic acid in 300 ml. of xylene containing 1.0 gram of benzoic acid and 0.5 gram sulfuric acid. The solution is heated at reflux for 7 hours after which it is determined that no phenyl ester (i.e., 2,4,6 - trimethylphenyl-4-cyanobenzoate) is formed.

EXAMPLE 12

The process of Example 11 is repeated except that 2,4-dimethylphenol is substituted for the 2,4,6-trimethylphenol. After the reflux period, it is determined that the phenyl ester 2,4 - dimethylphenyl - 4-cyanobenzoate is formed in substantial quantities. Thus, this example, taken with Example 11, also illustrates that at least one of the substituents adjacent the phenolic hydroxyl must be a hydrogen atom.

EXAMPLE 13

The process of Example 3 is repeated except that a solution of 6.9 grams of phenol, 10.0 grams of salicylic acid and 250 ml. of toluene containing 0.1 gram boric acid and 0.2 gram sulfuric acid was charged to the flask and heated at reflux for 29 hours. At the end of this period only trace amounts of phenyl salicylate are found thus indicating that the reaction is inefficient when a 2-hydroxybenzoic acid is used as the acid reactant.

EXAMPLE 14

The process of Example 3 is repeated except that a solution of 25 grams phenol, 50 grams of 1-hydroxy-2-naphthoic acid and 250 ml. of xylene containing 0.83 gram boric acid and 0.5 gram sulfuric acid are charged to the flask and heated at reflux for 19 hours. At the end of this period of time no appreciable amount of phenyl-1-hydroxy-2-naphthoate is formed. Again, this example illustrates that o-hydroxyaryl type acids are ineffective when used as the acid reactant in this process.

EXAMPLES 15–56

In the following examples, the process of Example 3 is repeated employing the phenolic and carboxylic components indicated in Table 1 in a 1:1 molar ratio, a 5 mole percent boric-sulfuric acid catalyst and 250 ml. of xylene. The solution is refluxed for a sufficient period of time to produce the indicated phenyl ester reaction product.

TABLE 1

| Example | $R^1$ | $R^2$ | $R^3$ | $R^4$ | $R^5$ | Carboxylic compound $R^6$ | n | Phenyl ester reaction product |
|---|---|---|---|---|---|---|---|---|
| 15 | H | H | H | CH$_3$O— | H | phenyl | 1 | CH$_3$O—C$_6$H$_4$—O—CO—C$_6$H$_5$ |
| 16 | CH$_3$— | H | H | CH$_3$O— | H | Same as above | 1 | CH$_3$O—C$_6$H$_3$(CH$_3$)—O—CO—C$_6$H$_5$ |
| 17 | H | H | CH$_3$— | CH$_3$O— | H | do | 1 | CH$_3$O—C$_6$H$_3$(CH$_3$)—O—CO—C$_6$H$_5$ |
| 18 | H | H | H | C$_3$H$_7$O— | H | do | 1 | C$_3$H$_7$O—C$_6$H$_4$—O—CO—C$_6$H$_5$ |
| 19 | H | H | H | C$_6$H$_{13}$O— | H | do | 1 | C$_6$H$_{13}$O—C$_6$H$_4$—O—CO—C$_6$H$_5$ |
| 20 | H | CH$_3$— | H | (CH$_3$)$_3$C—O— | H | do | 1 | (CH$_3$)$_3$C—O—C$_6$H$_3$(CH$_3$)—O—CO—C$_6$H$_5$ |
| 21 | H | H | H | C$_6$H$_5$—O— | H | do | 1 | C$_6$H$_5$—O—C$_6$H$_4$—O—CO—C$_6$H$_5$ |
| 22 | H | H | H | naphthyloxy | H | do | 1 | naphthyl—O—C$_6$H$_4$—O—CO—C$_6$H$_5$ |
| 23 | H | H | H | C$_6$H$_5$— | H | do | 1 | C$_6$H$_5$—C$_6$H$_4$—O—CO—C$_6$H$_5$ |
| 24 | H | H | H | | Naphthyl | —CH(CH$_3$)$_2$ | 1 | naphthyl—O—CO—CH(CH$_3$)$_2$ |
| 25 | H | H | H | C$_2$H$_5$—C$_6$H$_4$— | H | phenyl | 1 | C$_2$H$_5$—C$_6$H$_4$—C$_6$H$_4$—O—CO—C$_6$H$_5$ |
| 26 | H | H | H | Br—C$_6$H$_4$— | H | Same as above | 1 | Br—C$_6$H$_4$—C$_6$H$_4$—O—CO—C$_6$H$_5$ |

TABLE 1—Continued
| Example | $R^1$ | $R^2$ | $R^3$ | $R^4$ | $R^5$ | Carboxylic compound | $n$ | Phenyl ester reaction product |
|---|---|---|---|---|---|---|---|---|
| 27 | H | H | H | $C_2H_5O$— | H |  | 1 | |
| 28 | Cl— | H | H | H | H | Same as above | 1 | |
| 29 | H | H | H | Br | H | do | 1 | |
| 30 | $C_4H_9$— | H | H | H | H | do | 1 | |
| 31 | H | H | H | $CH_3CH_2C(CH_3)(CH_3)(CH_2CH_3)$— | H | do | 1 | |
| 32 | H | H | $C_{12}H_{25}$ | H | H | do | 1 | |
| 33 | H | H | H | $O_2N$— | H | do | 1 | |
| 34 | H | H | H | $C_2H_5N(CH_3)$— | H | do | 1 | |
| 35 | H | H | H | $C_4H_7N(H)$— | H | do | 1 | |
| 36 | H | H | H | C6H5–NH– | H | do | 1 | |
| 37 | H | H | H | $CH_3O_2S$— | H | do | 1 | |
| 38 | H | H | H | $C_4H_7O_2S$— | H | do | 1 | |

TABLE 1—Continued

| Example | R¹ | R² | R³ | R⁴ | R⁵ | Carboxylic compound R⁶ | n | Phenyl ester reaction product |
|---|---|---|---|---|---|---|---|---|
| 39 | H | H | H | ⟨C₆H₄⟩-O₂S- | H | ⟨C₆H₄⟩ | 1 | |
| 40 | H | H | H | F₂CHCH₂- | H | Same as above | 1 | |
| 41 | H | H | H | F₃CCH₂- | H | do | 1 | |
| 42 | H | H | H | CF₃(CF₂)₂(CH₂)₂- | H | do | 1 | |
| 43 | H | H | H | CH₃CHCHCH₂- | H | do | 1 | |
| 44 | H | H | H | (CH₃)₂CHCHCH₂- | H | do | 1 | |
| 45 | H | H | H | H | H | ⟨C₆H₄⟩ | 2 | |
| 46 | H | H | H | H | H | ⟨(CH₃)₂C₆H₂(CH₃)₂⟩ | 2 | |
| 47 | H | H | H | H | H | ⟨C₆H₄⟩ | 2 | |
| 48 | H | H | H | H | H | | 3 | |
| 49 | H | H | H | H | H | Cl-⟨C₆H₄⟩- | 1 | |
| 50 | H | H | H | H | H | CH₃O-⟨C₆H₄⟩- | 1 | |

TABLE 1—Continued

| Example | R¹ | R² | R³ | R⁴ | R⁵ | Carboxylic compound R⁶ | n | Phenyl ester reaction product |
|---|---|---|---|---|---|---|---|---|
| 51 | H | H | H | H | H | naphthyl | 1 | phenyl naphthoate |
| 52 | H | H | H | H | H | —CH₂CH₂CH₃ | 1 | phenyl butyrate |
| 53 | H | H | H | H | H | —CH₃ | 1 | phenyl acetate |
| 54 | H | H | H | H | H | —(CH₂)₅CH₃ | 1 | phenyl heptanoate |
| 55 | H | H | H | H | H | —(CH₂)₁₂CH₃ | 1 | phenyl tetradecanoate |
| 56 | H | H | H | H | H | H—C=C—H (phenyl cinnamate group) | 1 | phenyl cinnamate |

EXAMPLES 57–66

The procedure of Example 3 is repeated except that equal molar amounts of the borate and sulfuric acid constituents indicated in Table 2 are employed to form the borate-sulfuric acid catalyst complex. Approximately 5 mole percent (based on the weight of the phenolic compound) of the catalyst complex is added to the reactants in each example. In each instance phenyl benzoate is produced.

TABLE 2

| | Catalyst complex | |
|---|---|---|
| | Borate constituent | Sulfuric acid constituent |
| Example: | | |
| 57 | Boric acid | Sulfur Trioxide |
| 58 | Boron trifluoride | Do. |
| 59 | Boric acid | Sodium hydrogen sulfate |
| 60 | Sodium borate | Do. |
| 61 | Boric acid | Potassium hydrogen sulfate |
| 62 | Boron tribromide | Do. |
| 63 | Boric acid | Dimethyl sulfate |
| 64 | Boron trichloride | Sulfuric acid |
| 65 | Calcium borate | Do. |
| 66 | Sodium metaborate | Do. |

Although the invention has been described in considerable detail with particular reference to certain preferred embodiments thereof, variations and modifications may be effected within the spirit and scope of the invention.

I claim:
1. A process for the synthesis of phenyl esters of a phenolic compound having at least one active hydroxyl group which comprises reacting said phenolic compound having the general formula:

wherein the substituents R¹–R⁵ are selected from the group comprising hydrogen atoms, halogen atoms, alkyl of 1 to 18 carbon atoms, aryl of 6 to 12 carbon atoms, hydroxy, alkoxy of 1 to 18 carbon atoms, aryloxy of 6 to 12 carbon atoms, alkyl- or aryl substituted amino of 1 to 12 carbon atoms, alkylsulfonyl or arylsulfonyl of 1 to 18 carbon atoms, fluorinated alkyl of 1 to 18 carbon atoms, cyano, thiocyano, thiol and nitro], at least one of the substituents R¹ and R² being a hydrogen atom, with a carboxylic acid compound having the general formula $$\left( HO - \overset{O}{\underset{\|}{C}} \right)_n R^6$$

wherein $n$ is a positive integer of from 1 to 3, and R⁶ is selected from the group comprising alkyl of 1 to 18 carbon atoms and aryl of 6 to 18 carbon atoms having no hydroxyl group attached to the aryl ring adjacent to the active carboxylic group, at a temperature of between about 75° C. and about 285° C. in the presence of a catalytic amount of a borate-sulfuric acid catalyst complex wherein the borate constituent of said catalyst complex is selected from the group comprising boron halides, boric acid, boric anhydride, polyborates and salts of ortho- and meta-boric acids, and the sulfuric acid constituent of said catalyst complex is selected from the group comprising sulfuric acid, sulfur trioxide, sodium hydrogen sulfate, potassium hydrogen sulfate and dimethyl sulfate and recovering said phenyl ester from the reaction mixture.

2. A process according to claim 1 wherein from about 0.01 to about 20 mole percent, based on the phenolic compound, of the catalyst complex is employed.

3. A process according to claim 2 wherein said reaction solution includes a solvent for said phenyl esters.

4. A process according to claim 3 wherein said solvent is selected from the group comprising hexane, heptane, toluene, xylene, cyclohexane, decalin, benzene, tetrahydrofuran, dioxane, dimethylsulfoxide, dimethylformamide, dimethylsulfone, acetonitrile, hexamethylphosphoramide, sulfolane and diphenyl ether.

5. A process according to claim 1 wherein the molar ratio of said phenolic compound to said carboxylic acid compound is between about 0.1:1 to 10:1.

6. A process according to claim 1 wherein said phenolic compound is selected from the group having the general formula:

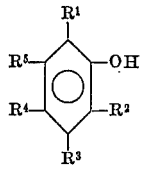

wherein the substituents $R^1$–$R^5$ are selected from the group comprising hydrogen atoms, halogen atoms, alkyl of 1 to 12 carbon atoms, aryl of 6 to 12 carbon atoms, hydroxy, alkoxy of 1 to 6 carbon atoms, aryloxy of 6 to 12 carbon atoms, alkyl- or aryl substituted amino of 1 to 4 carbon atoms, alkylsulfonyl or arylsulfonyl of 1 to 4 carbon atoms and fluorinated alkyl of 1 to 18 carbon atoms, at least one of the substituents $R^1$ or $R^2$ being a hydrogen atom.

7. A process according to claim 1 wherein said carboxylic acid compound is selected from the group having the general formula:

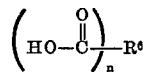

wherein $n$ is a positive integer of from 1 to 3, and $R^6$ is selected from the group comprising alkyl of 1 to 12 carbon atoms, and aryl of 6 to 12 carbon atoms having no hydroxyl group attached to the aryl ring adjacent to the active carboxylic group.

8. A process according to claim 1 wherein the borate constituent of said catalyst complex is boric acid and the sulfuric acid constituent is sulfuric acid.

9. A process according to claim 1 wherein said phenolic compound is selected from the group comprising phenol, cresol, anisole, para-chlorophenol, para-nitrophenol, para-cyanophenol, hydroquinone, para-tertiary-octylphenol, para-hydroxybiphenyl, 1-naphthol, 2-naphthol, para-hydroxydiphenyl ether and para-dimethylaminophenol.

10. A process according to claim 9 wherein said carboxylic acid compound is selected from the group comprising acetic, propionic, butyric, benzoic, naphthoic, terephthalic, isophthalic, toluic, nitrobenzoic, chlorobenzoic and cinnamic.

11. A process according to claim 10 wherein the borate constituent of said catalyst complex is boric acid and the sulfuric acid constituent is sulfuric acid.

12. A process according to claim 11 wherein the temperature of the reaction is maintained at between about 100° C. and about 250° C.

13. A process according to claim 12 wherein the reaction solution includes a solvent selected from the group comprising toluene and xylene.

References Cited

UNITED STATES PATENTS 2,822,378  2/1958  Bader _____ 260—476 X
3,106,570  10/1963  Jaruzelski et al. ____ 260—476 X

OTHER REFERENCES

Hirao et al.: Chemical Abstracts, Vol. 48, p. 10536 (1954).

Hirao et al.: Chemical Abstracts, Vol. 49, p. 11593 (1955).

LEWIS GOTTS, Primary Examiner

D. H. TORRENCE, Assistant Examiner

U.S. Cl. X.R.

252—432, 433; 260—332.2 A, 347.4, 410.5, 454, 469, 471 R, 473 R, 474, 475 PN, 479 R